(12) United States Patent
Pidan et al.

(10) Patent No.: US 12,076,743 B2
(45) Date of Patent: Sep. 3, 2024

(54) SPREADING UNIT WITH ADJUSTABLE CONTOUR

(71) Applicant: Broetje-Automation, Rastede (DE)

(72) Inventors: Sergej Pidan, Winnenden (DE); Kay Rupp, Stuttgart (DE)

(73) Assignee: Broetje-Automation GmbH, Rastede (DE)

( * ) Notice: Subject to any disclaimer, the term of this patent is extended or adjusted under 35 U.S.C. 154(b) by 0 days.

(21) Appl. No.: 17/966,254

(22) Filed: Oct. 14, 2022

(65) Prior Publication Data

US 2023/0182165 A1 Jun. 15, 2023

Related U.S. Application Data

(63) Continuation of application No. 16/060,599, filed as application No. PCT/EP2016/080358 on Dec. 9, 2016, now abandoned.

(30) Foreign Application Priority Data

Dec. 9, 2015 (DE) .................... 10 2015 121 449.0

(51) Int. Cl.
| | | |
|---|---|---|
| *B05C 11/02* | (2006.01) | |
| *B05C 11/04* | (2006.01) | |
| *B29C 64/214* | (2017.01) | |
| *B29C 64/227* | (2017.01) | |
| *B29C 64/232* | (2017.01) | |

(Continued)

(52) U.S. Cl.
CPC .......... *B05C 11/023* (2013.01); *B05C 11/042* (2013.01); *B29C 64/214* (2017.08); *B29C 64/227* (2017.08); *B29C 64/232* (2017.08); *B31F 1/14* (2013.01); *B41F 15/42* (2013.01); *D21H 25/10* (2013.01)

(58) Field of Classification Search
CPC ...... B05C 11/023; B05C 11/042; D21H 25/10
USPC ................................ 118/126, 119, 413, 419
See application file for complete search history.

(56) References Cited

U.S. PATENT DOCUMENTS

| 3,524,781 A | 8/1970 | Winterroth et al. |
| 4,246,335 A | 1/1981 | Keogh et al. |

(Continued)

FOREIGN PATENT DOCUMENTS

| CN | 202881755 | 4/2013 |
| CN | 202921520 | 5/2013 |

(Continued)

OTHER PUBLICATIONS

"Chinese Search Report," for Chinese Patent Application No. 201680072199.6 mailed Apr. 21, 2020 (3 pages) English Translation Only.

(Continued)

*Primary Examiner* — Karl Kurple
(74) *Attorney, Agent, or Firm* — Pauly, DeVries Smith & Deffner LLC

(57) ABSTRACT

Various embodiments of the disclosure relate to a spreading unit, having a shaper, for spreading viscous material, in particular sealing material, on a component, wherein the shaper has a shaping contour for the forming of the viscous material in the course of the spreading. It is proposed that the shaping contour of the shaper for the forming of the viscous material is adjustable by actuator-based means.

15 Claims, 6 Drawing Sheets

(51) Int. Cl.
*B31F 1/14* (2006.01)
*B41F 15/42* (2006.01)
*D21H 25/10* (2006.01)

(56) References Cited

U.S. PATENT DOCUMENTS

| | | | |
|---|---|---|---|
| 4,666,732 A * | 5/1987 | Schucker | G05D 7/0623 |
| | | | 118/663 |
| 4,899,687 A | 2/1990 | Sommer et al. | |
| 5,409,732 A * | 4/1995 | Leonard | D06B 1/14 |
| | | | 118/119 |
| 5,647,111 A | 7/1997 | Zienkiewicz et al. | |
| 5,656,086 A * | 8/1997 | Hultzsch | B05C 5/0254 |
| | | | 118/410 |
| 6,033,477 A * | 3/2000 | Ueberschar | B05C 11/041 |
| | | | 118/126 |
| 6,139,637 A * | 10/2000 | Takahashi | B05C 5/004 |
| | | | 118/410 |
| 6,203,615 B1 | 3/2001 | Muench | |
| 6,231,327 B1 | 5/2001 | Shanahan et al. | |
| 6,468,588 B1 * | 10/2002 | Bernert | B05C 11/025 |
| | | | 118/206 |
| 6,682,680 B2 | 1/2004 | Peterman | |
| 9,366,528 B2 * | 6/2016 | Bucher | B05C 5/0254 |
| | | | 118/410 |
| 9,757,760 B2 | 9/2017 | Halder et al. | |
| 9,925,555 B2 | 3/2018 | Karusalmi et al. | |
| 9,968,962 B2 | 5/2018 | Weinmann et al. | |
| 10,035,172 B2 | 7/2018 | Okamoto et al. | |
| 10,758,930 B2 | 9/2020 | Dupouy | |
| 2004/0129298 A1 * | 7/2004 | Sarda | B05C 11/025 |
| | | | 118/206 |
| 2009/0202727 A1 | 8/2009 | Abas et al. | |
| 2009/0202745 A1 | 8/2009 | Pavani et al. | |
| 2010/0178433 A1 | 7/2010 | Wang et al. | |
| 2012/0315378 A1 * | 12/2012 | Yapel | B05D 1/265 |
| | | | 427/8 |
| 2013/0142955 A1 | 6/2013 | Lambert et al. | |
| 2018/0369855 A1 | 12/2018 | Pidan et al. | |

FOREIGN PATENT DOCUMENTS

| | | |
|---|---|---|
| DE | 3012988 | 10/1980 |
| DE | 3729621 | 3/1989 |
| DE | 29716647 | 10/1997 |
| DE | 19755411 | 6/1999 |
| DE | 10246327 | 5/2003 |
| DE | 102005055162 | 8/2006 |
| DE | 102009002017 | 10/2010 |
| DE | 202010015980 | 9/2013 |
| EP | 2896463 | 7/2015 |
| GB | 2259262 | 3/1993 |
| JP | H03109673 | 11/1991 |
| JP | 2002248406 | 9/2002 |
| JP | 2014057638 | 4/2014 |
| WO | 2017097949 | 6/2017 |

OTHER PUBLICATIONS

File History for U.S. Appl. No. 16/060,599 downloaded Mar. 8, 2023 (600 pages).
"German Search Report," for Priority Application No. DE102015121449.0 mailed Jul. 1, 2016 (10 pages).
"International Search Report and Written Opinion," for PCT Application No. PCT/EP2016/080358 mailed Feb. 28, 2017 (24 pages).

* cited by examiner

SPREADING UNIT WITH ADJUSTABLE CONTOUR

CROSS-REFERENCE TO RELATED APPLICATIONS

This application is a continuation application of prior U.S. application Ser. No. 16/060,599 filed Jun. 8, 2018, which is a national stage application under 35 U.S.C. 371 of International Patent Application Serial No. PCT/EP2016/080358, entitled "Spreading Unit," filed Dec. 9, 2016, which claims priority from German Patent Application No. DE 10 2015 121 449.0, filed Dec. 9, 2015, the disclosure of which is incorporated herein by reference.

FIELD OF THE TECHNOLOGY

The disclosure relates to a spreading unit for spreading viscous material and to a method for spreading a viscous material.

BACKGROUND

For the application of viscous material, in particular sealing material such as, for instance, aircraft sealants or silicone-like sealing material, various application units are known. For instance, in EP 2 896 463 A1 a shaping nozzle for the application and forming of a seal seam on a component is described. With a nozzle, only a seam with a nozzle-specific shape can here respectively be formed.

In addition, in Japanese printed publication JP 2014-057638 a spreading unit for applying and spreading sealing material is described. This spreading unit has two brush portions, which, for the bridging of offsets in a component, can be manually adjusted relative to each other. Two portions of different height across a projection can herewith be surface-treated. For the adjustment, the spreading process has to be interrupted. In addition, a continuous adaptation of the spreading unit to changing component surfaces is also not possible.

SUMMARY

The problem underlying the disclosure is to design and refine a known spreading unit such that viscous material can be easily and flexibly spread on a component.

This object is achieved by a spreading unit having features as described herein.

More particularly, for this purpose, a spreading unit, having a shaper, for spreading viscous material on a component is proposed. The shaper has a shaping contour for the forming of the viscous material in the course of the spreading. Because the shaping contour of the shaper, for the forming of the viscous material, is adjustable by actuator-based means, the shaping contour can be flexibly and easily adapted to the component. In some embodiments, it is possible to adjust the shaping contour in the course of the spreading in order to adapt the thus produced seam to component requirements. A simple, flexible and cost-effective spreading of viscous material is hereby enabled.

The viscous material can be constituted, in particular, by a sealing material, in particular an aircraft sealant or a silicone-like sealing material. The component can be an assembly of parts and the viscous material can be spread along a joint of the parts of the assembly.

The spreading of the viscous material can be effected by a movement of the component and/or by a movement of the spreading unit. With a view to a flexible and an at least partially automated production, it has proved advantageous if the spreading unit is configured as an end effector for a manipulator, such as, for instance, a portal machine and/or an industrial robot.

For the application of the viscous material on the component, according to one refinement of the disclosure it is proposed that the spreading unit has a nozzle. In various embodiments, the nozzle and the shaper have a fixed distance apart. In this way, in the drawing of seams with the viscous material, a uniform drying and/or hardening of the viscous material from the time of discharge from the nozzle to the point of forming by the shaping contour can be obtained, for instance. The seam quality is hereby able to be easily raised.

According to a further embodiment, the spreading unit has a sensor for detecting that region of the component which is to be coated. With the aid of the sensor, a joint which is intended to be coated with the viscous material can be detected, for instance. In addition, a volume flow and/or mass flow, which is required, for instance, to fill the joint, is determinable.

In various embodiments, the shaper has rods, which are adjustable by actuator-based means, in particular are linearly adjustable, for the adjustment of the shaping contour. In this way, various shaping contours are very easily able to be set in a very flexible manner.

In some embodiments, it is provided that the shaper has a casing, which provides the shaping contour. In this way, a continuous shaping contour is able to be easily realized.

In addition, the above-stated object is achieved by a system having features described herein. To this system is attached independent inventive importance. The same advantages are obtained as previously described in connection with the spreading unit.

According to a further teaching of the disclosure, the above-stated object is achieved according to a method having features described herein.

The same advantages are obtained as previously described in connection with the spreading unit and the system for spreading viscous material. In some embodiments, the viscous material is coated in an automated manner.

Some embodiments provide a spreading unit, having a shaper, for spreading viscous material, in particular sealing material, on a component, the shaper having a shaping contour for the forming of the viscous material in the course of the spreading, wherein the shaping contour of the shaper for the forming of the viscous material is adjustable by actuator-based means.

In some embodiments, the spreading unit has a nozzle for applying the viscous material, in particular the sealing material, on the component.

In some embodiments, the spreading unit has a sensor, in particular a line laser, for detecting that region of the component which is to be coated.

In some embodiments, the shaper has rods, which are adjustable by actuator-based means, in particular are linearly adjustable, for the adjustment of the shaping contour.

In some embodiments, the rods are adjustable by actuator-based means in one direction of motion and in the direction opposite to the direction of motion, and/or wherein the rods are adjustable by actuator-based means in one direction of motion and are pretensioned in the direction opposite to the direction of motion.

In some embodiments, the shaper has a casing, which provides the shaping contour, wherein the casing consists of elastomer material and/or comprises elastomer material.

In some embodiments, the spreading unit has a contour shaft having a servo drive for the adjustment of the rods.

In some embodiments, for the adjustment of the shaping contour, a plurality of rods, in particular each rod, are/is individually driven.

In some embodiments, the rods are adjustable via piezo actuators.

Some embodiments provide a system for spreading viscous material on a component, the system having a component receptacle for receiving a component, wherein the system has a spreading unit as described herein.

In some embodiments, the system has a manipulator having the spreading unit as the end effector.

Some embodiments provide a method for spreading a viscous material on a component by means of a spreading unit having a shaper having a shaping contour, the spreading unit such as being configured as described herein, wherein the shaping contour of the shaper for changing the shape of the viscous material is adjusted by actuator-based means.

In some embodiments, a sensor, in particular a line laser, detects a region to be coated of the component, and the sensor data are analyzed by a control system, wherein, by means of the control system, the shaping contour of the shaper is controlled and/or regulated in dependence on the sensor data.

In some embodiments, the control system controls and/or regulates, in dependence on the sensor data, the relative movement between the component and the spreading unit.

In some embodiments, the control system regulates and/or controls, in dependence on the sensor data, the volume flow and/or mass flow of viscous material through a nozzle onto the region to be coated.

In some embodiments, that region of the component which is to be coated has a joint, in particular a gap and/or an edge, and wherein the shaping contour is adapted to the joint, in particular the gap and/or the edge.

In some embodiments, with the spreading of the viscous material, a seam is produced, wherein the cross section at the start and/or end of the seam is diminished by an alteration of the shaping contour.

In some embodiments, in the course of the spreading, cross-sectional changes of the seam are continuously performed by alteration of the shaping contour.

BRIEF DESCRIPTION OF THE DRAWINGS

Below, various embodiments are explained in greater detail with reference to a drawing representing just one illustrative embodiment. In the drawing.

DETAILED DESCRIPTION

Figure 1:
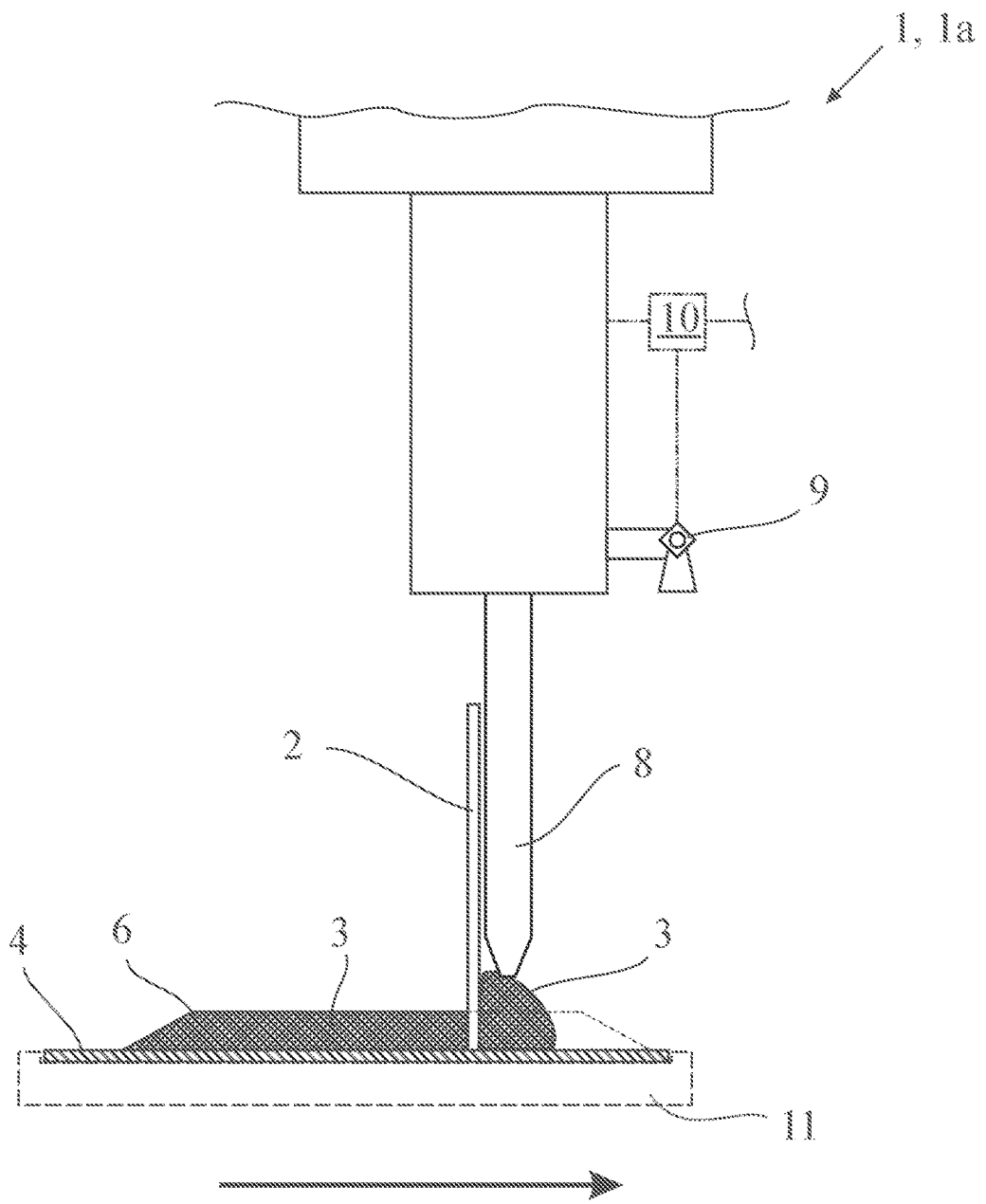
FIG. 1 shows in schematic representation a spreading unit for spreading viscous material.

FIG. 1 shows a spreading unit 1, having a shaper 2, for spreading viscous material 3 on a component 4.

Figure 2:
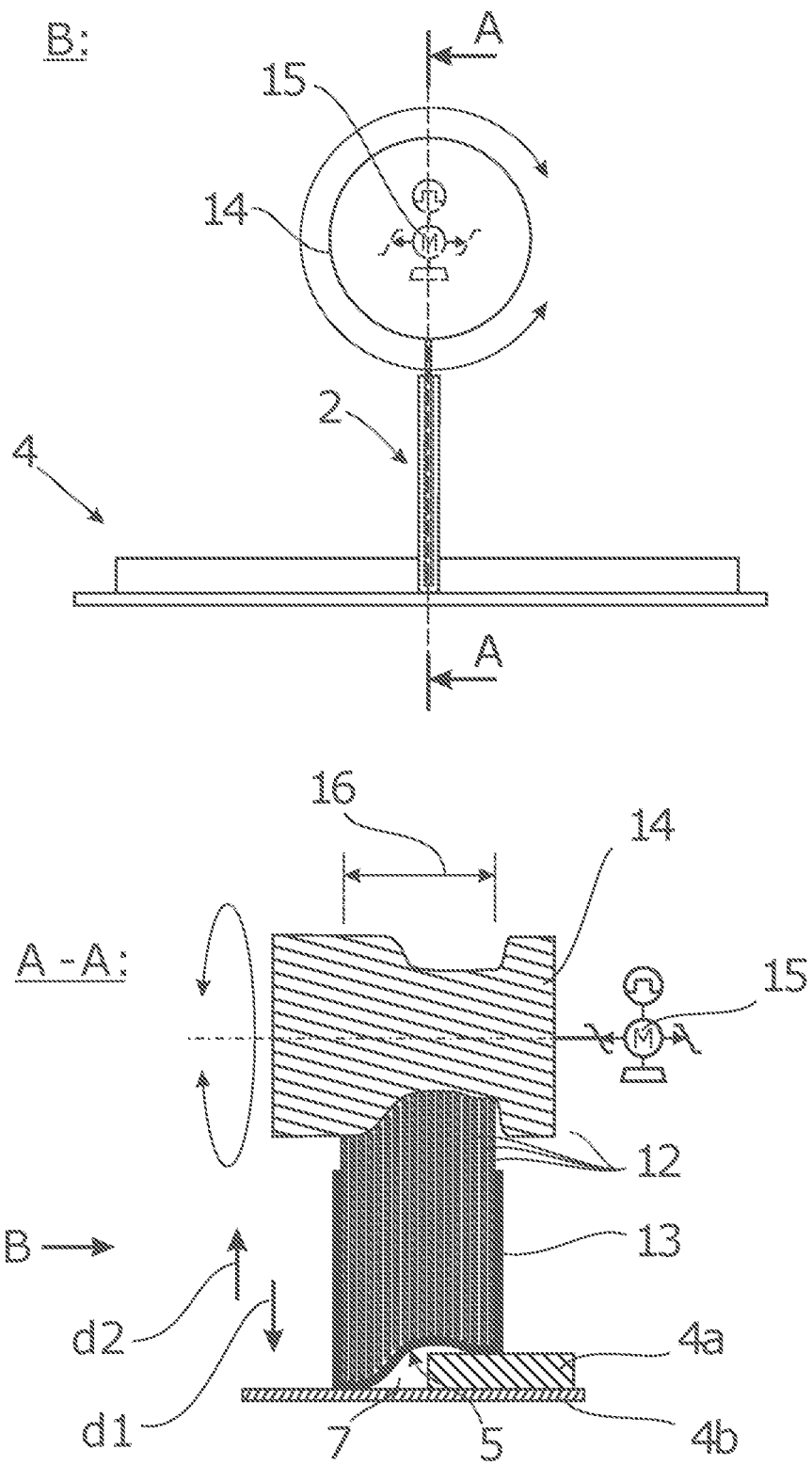
FIG. 2 shows a schematic representation of a first embodiment of the shaper in two views.

The shaper 2 has, as shown in FIG. 2, a shaping contour 5 for the forming of the viscous material 3 in the course of the spreading. The viscous material 3 can be constituted by a sealing material, in particular an aircraft sealant or a silicone-like sealing material. The component 4 can in particular be an assembly, such as an aircraft structural component and/or a motor vehicle part, in particular a body structural component.

The disclosure has recognized that, if the shaping contour 5 of the shaper 2 for the forming of the viscous material 3 is adjustable by actuator-based means, the spreading unit 1 is usable in a very versatile manner. With it, various shapes of the viscous material 3 can be produced. In various embodiments, it is possible to change the shaping of the viscous material 3 during the spreading.

In various embodiments, with the spreading of the viscous material 3 a seam 6 is produced. With the viscous material 3, a joint 7 in a component 4, for instance, can be filled and/or sealed. The joint 7 can be, for instance, a gap or an edge.

In various embodiments, with the spreading unit 1, the shaping contour 5 of the shaper 2 for the forming of the viscous material 3 can be adjusted also during the spreading, it is possible to continuously perform cross-sectional changes of the seam 6 by an alteration of the shaping contour 5. This can be fluidically advantageous if the component 4 is constituted by an aircraft structural component and/or a motor vehicle part. Due to the shape of the seam, the air resistance can then be reduced during flying and/or driving.

As can be seen in FIG. 1, the spreading unit 1 can have, for the application of the viscous material 3 on the component, a nozzle 8. The nozzle 8 can be arranged before the shaper 2 in the relative direction of motion d1 of the spreading unit 1 to the component 4.

In various embodiments, the nozzle 8 is arranged at a predefined fixed distance from the shaper 2. A robust spreading process can hereby be ensured, since the viscous material 3 can presolidify and/or partially harden in a predefined manner on the path section from the nozzle 8 to the shaper 2. In the case of a compressible viscous material 3, the viscous material 3 can hereby extend and/or expand prior to the shaping. The distance between the nozzle 8 and the shaper 2 can be maximally 5 cm, further can be maximally 3 cm or maximally 1 cm.

Furthermore, the spreading unit 1 can have a sensor 9 for detecting the region to be coated, such as a joint 7, of the component 4. The sensor 9 can be arranged before the nozzle 8 and/or the shaper 2 in the relative direction of motion d1. In the course of the spreading, it can run ahead of the nozzle 8 and/or the shaper 2. In various embodiments, the sensor 9 is configured as an optical sensor, in particular a line laser. With a line laser, a reliable detection is enabled.

In various embodiments, the sensor 9 detects a region to be coated of the component 4, and a control system 10 analyzes the sensor data. In various embodiments, by means of the control system 10, the shaping contour 5 of the shaper 2 is controlled and/or regulated in dependence on the sensor data. Additionally or alternatively, the control system 10 can control and/or regulate, in dependence on the sensor data, the relative movement between the component 4 and the spreading unit 1. By a combination of controlling the relative movement and the shaping contour, the seam quality can be raised. For instance, motional deviations of a manipulator carrying the spreading unit can in this way be compensated by an adjustment of the shaping contour.

In various embodiments, that region of the component 4 which is to be coated has a joint 7, in particular a gap and/or an edge, and the shaping contour 5 is adapted to the joint 7, in particular the gap and/or the edge. This can be seen, for instance, in FIG. 5.

A seam 6 can be created in such a way that the cross section at the start 6a and/or end 6b of the seam 6 is diminished by an alteration of the shaping contour 5. This applies, in particular, also to the start and/or the end of a seam 6, if it, in the region of the start and/or end, overlaps with a seam.

Additionally or alternatively, in the course of the spreading, cross-sectional changes of the seam 6 can be continuously performed by an alteration of the shaping contour 5. A better seam pattern is hereby obtained.

Additionally or alternatively, the control system 10 can control and/or regulate, in dependence on the sensor data, the relative movement between the component 4 and the spreading unit 1. The relative movement, which is necessary for the spreading, between component 4 and shaper 2 can here be generated in different ways. For instance, the spreading unit 1 can be configured as an end effector 1a and be moved relative to the component 4. Additionally or alternatively, the component 4 can be moved relative to the shaper 2. For instance, the component 4 can be received in a component receptacle 11 and the component receptacle 11 can be moved relative to the shaper 2. As a result, systems according to the proposal are respectively formed.

According to a further embodiment, it can be provided that the control system 10 regulates and/or controls, in dependence on the sensor data, the volume flow and/or mass flow of viscous material through a nozzle 8 onto the region to be coated.

If the joint 7 widens, for instance, then the volume flow or mass flow can be increased and/or the shaping contour 5 adjusted and the joint 7 filled, without the speed of the relative movement having to be adapted.

Additionally or alternatively, the volume flow or mass flow of viscous material can be regulated and/or controlled in dependence on the shape of the shaping contour 5 and/or in dependence on the feed rate.

In various embodiments, the shaping contour 5 can be adjusted in such a way that the seam 6, in the course of the spreading, is convexly and/or concavely configured. In various embodiments, the shaping contour 5 can be adjusted in line with the component 4 in such a way that the shaping contour 5 forms an opening, in the shape of the seam 6 to be formed, with the component 4, and bears on both sides, in particular at the ends of the shaping contour 5, against the component 4.

As is shown in FIGS. 2 to 6, the shaper 2 here has for the adjustment of the shaping contour 5 rods 12 which are adjustable by actuator-based means, in particular linearly adjustable rods 12. Via the adjustment of rods 12, various shaping contours 5 are able to be provided in a quite simple manner. In various embodiments, the rods 12 are adjustable, in particular continuously, between a retracted and an extended setting.

Here, the rods 12 are adjustable by actuator-based means in one direction of motion d1 and in the direction opposite to the direction of motion d2, and/or are adjustable in one direction of motion d1 and pretensioned in a direction opposite to the direction of motion d2. In this way, a linear adjustment is able to be provided in a particularly simple manner.

The shaper 2 can have a casing 13, which provides the shaping contour 5. Here, the casing 13 is drawn over a plurality of rods 12, in particular all rods 12. The casing 13 can consist of an elastomer material, in particular rubber, and/or comprises an elastomer material, in particular rubber. That region of the casing 13 which forms the shaping contour 5 can be of reinforced, in particular thicker configuration. In various embodiments, the casing is arranged, moreover, detachably on the shaper 2. As a result, it can be easily exchanged, for instance if a different viscous material is intended to be used.

Here, the pretension in the direction opposite to the direction of motion d2 can be provided by the casing 13.

According to one illustrative embodiment, as is shown schematically in FIG. 2, the spreading unit 1 has a contour shaft 14 having a servo drive 15 for the adjustment of the rods 12. The contour shaft 14 has an adjustable portion 16. The adjustable portion, in particular the contour shaft 14, can be of one-piece configuration or can be multipart. In various embodiments, the adjustable portion is formed by individual disks. As a result, various adjustable portions can be provided in a simple and cost-effective manner by exchange of the disks.

The adjustable portion 16 can be in continuous engagement with the rods 12. In various embodiments, the radius of the adjustable portion 16 varies over the circumference and/or over its width. The change in radius over the circumference and/or the width can be of continuous configuration. Additionally or alternatively, the adjustable portion, in particular over its width, can be of stepped configuration. In this context, a step can have substantially at least the width of a rod 12. In various embodiments, a step is formed by a disk.

The change of shaping contour 5 during the spreading shall be explained in greater detail below, the spreading unit 1 of the illustrative embodiment of FIG. 2, with reference to FIG. 3.

Figure 3:
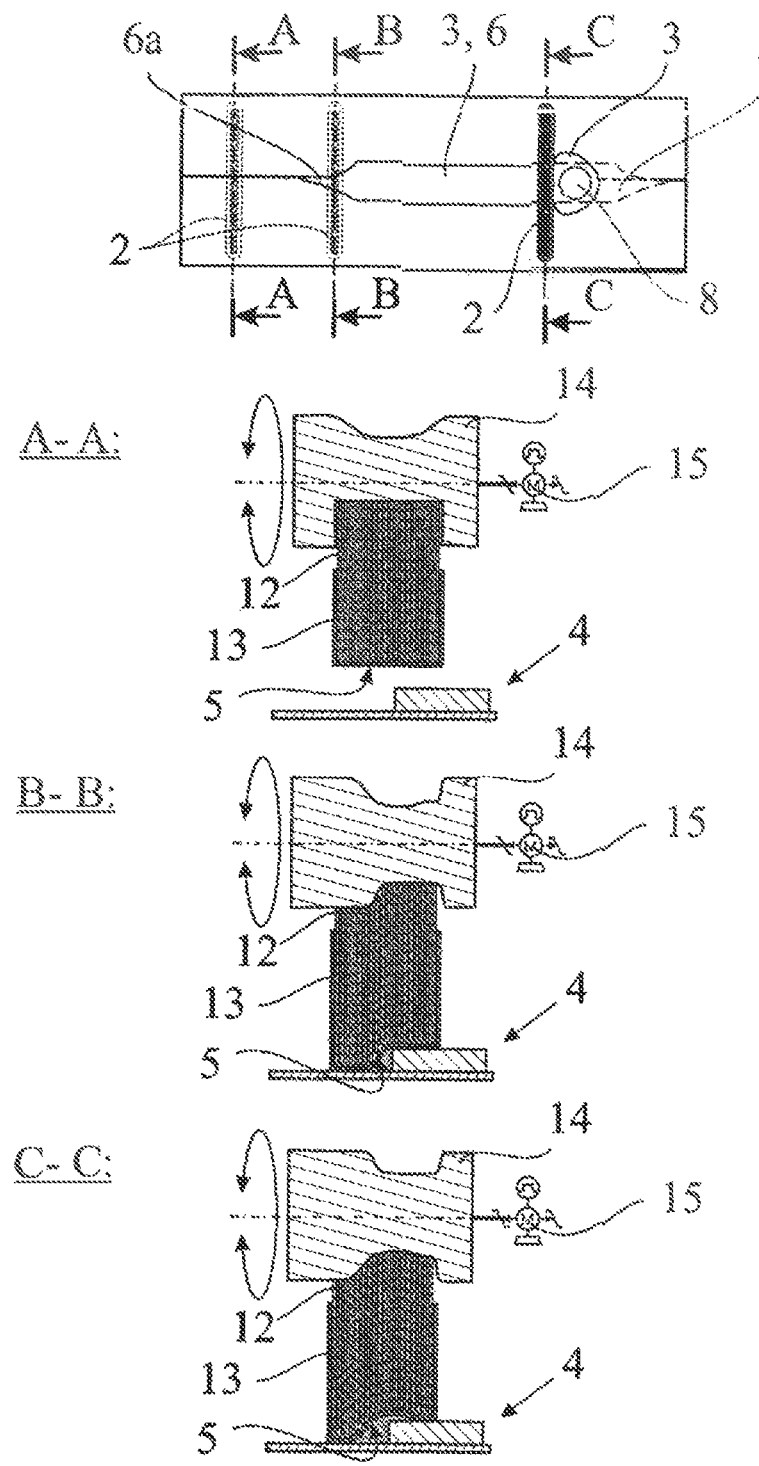
FIG. 3 shows the embodiment from FIG. 2 with differently adjusted shaping contour.

In FIG. 3, in the upper image, a top view of a component 4 is shown. As can be seen from sections A, B and C, the component 4 has two parts 4a, 4b, which are connected to each other in the form of a lap joint. The viscous material 3 is intended to be applied into the joint 7 as the seam 6. Also the seam 6 can be clearly seen from the image in FIG. 3, as well as the setting of the shaper 2 in three positions in the course of the spreading of the viscous material 3.

In section A can be seen a place in which no viscous material 3 is intended to be applied. Here the shaper 2 is located somewhat above the component 4.

The component 4 is struck by the shaper 2 and/or the shaping contour 5 is adapted to the seam 6 to be formed.

The shaping contour 5 is in the illustrative embodiment of FIG. 2 and can be formed by a rotation of the contour shaft 14. In the course of the spreading, the shape of the seam 6 is adapted by a rotation of the contour shaft 14. The seam 6 can be built up continuously. Section B shows the shape of the shaping contour 5 during the continuous build-up of the seam 6. If the seam 6 is structured in its shape, the seam 6, as is evident in Section C, is carried on continuously. In this region, the shaping contour 5 can be not adapted. If the joint 7 changes, however, the shaping contour 5 can be adapted.

Figure 4:
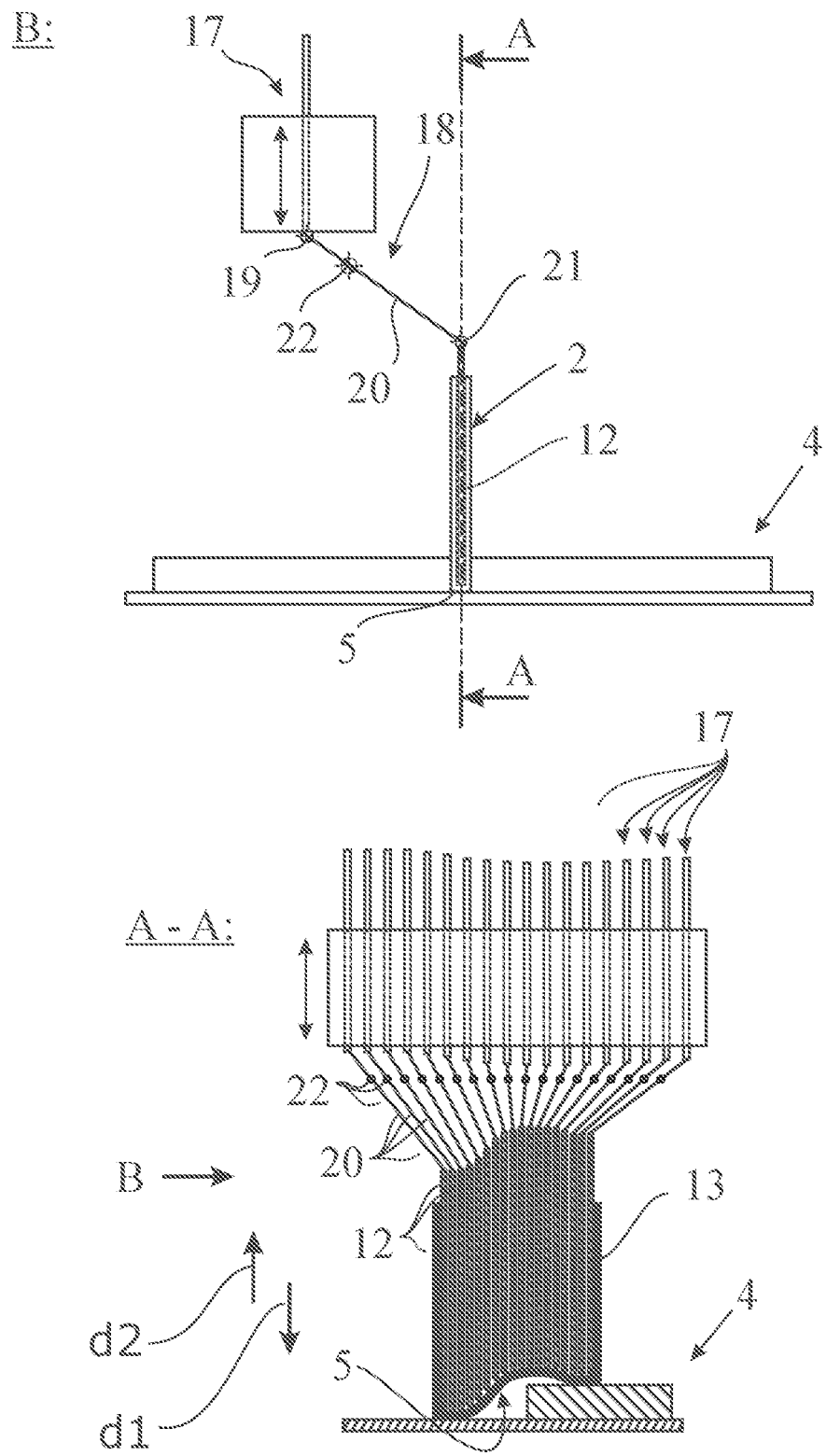
FIG. 4 shows a schematic representation of a second embodiment of the shaper in two views.

An alternative illustrative embodiment of the shaper 2 is shown in FIG. 4. Here, the adjustment of the shaping contour 5 is not effected via a contour shaft 14 having a servo drive 15. Here, the adjustment of the shaping contour 5 is effected by a plurality of individually driven rods 12. Further, each rod 12 can be driven individually.

Here, the rods 12 are driven or adjusted via piezo actuators 17. The adjustment via piezo actuators 17 has the advantage that a realization of an individual drive of a rod 12 is possible in a particularly simple and space-saving manner.

The piezo actuators 17 can drive the rods 12 directly. In the illustrative embodiment of FIG. 4, the piezo actuators are not arranged directly on the rods 12. Here, the piezo actuators 17 drive the rods 12 via a lever mechanism 18.

Here, the output of the piezo actuator 17 is connected by a hinged joint 19 to a lever 20 of the lever mechanism 18. The piezo actuator 17 thus acts via the lever 20 on the rod 12. Also the rod 12 can be connected by a hinged joint 21 to the lever 20. The hinged joints 19, 21 with which the piezo actuators 17 and the rods 12 are connected to the lever 20 are here arranged at the ends of the lever 20. For the provision of a transmission, the lever 20 is here pivotally mounted in a bearing 22. In various embodiments, by virtue of the latter, a slight movement of the piezo actuator 17 is converted into a greater movement of the rod 12. Here, in the course of the adjustment process, the piezo actuator 17 moves on a line parallelly offset from the rod 12. Other arrangements are also conceivable, however.

In principle, with the piezo actuators 17, shaping contours 5 can be produced in much the same way as in the illustrative embodiment comprising the contour shaft 14 and the servo drive 15. To this extent, reference can be made in this regard to the previous comments on this subject. It should be noted, however, that a shaper 2 with piezo actuators 17 can provide shaping contours 5 in a significantly more flexible manner than is possible with a contour shaft 14 and the servo drive 15.

According to a further illustrative embodiment (not shown in the figures), the adjustment of the shaping contour 5 can be effected using compressed air. A plurality of rods 12 can here be individually driven or adjusted with compressed air. For example, each rod 12 can be driven or adjusted using compressed air.

Before now examining various possible contours into which the shaping contour 5 can be adjusted, a joint 7 of varying width shall be described.

Figure 5:
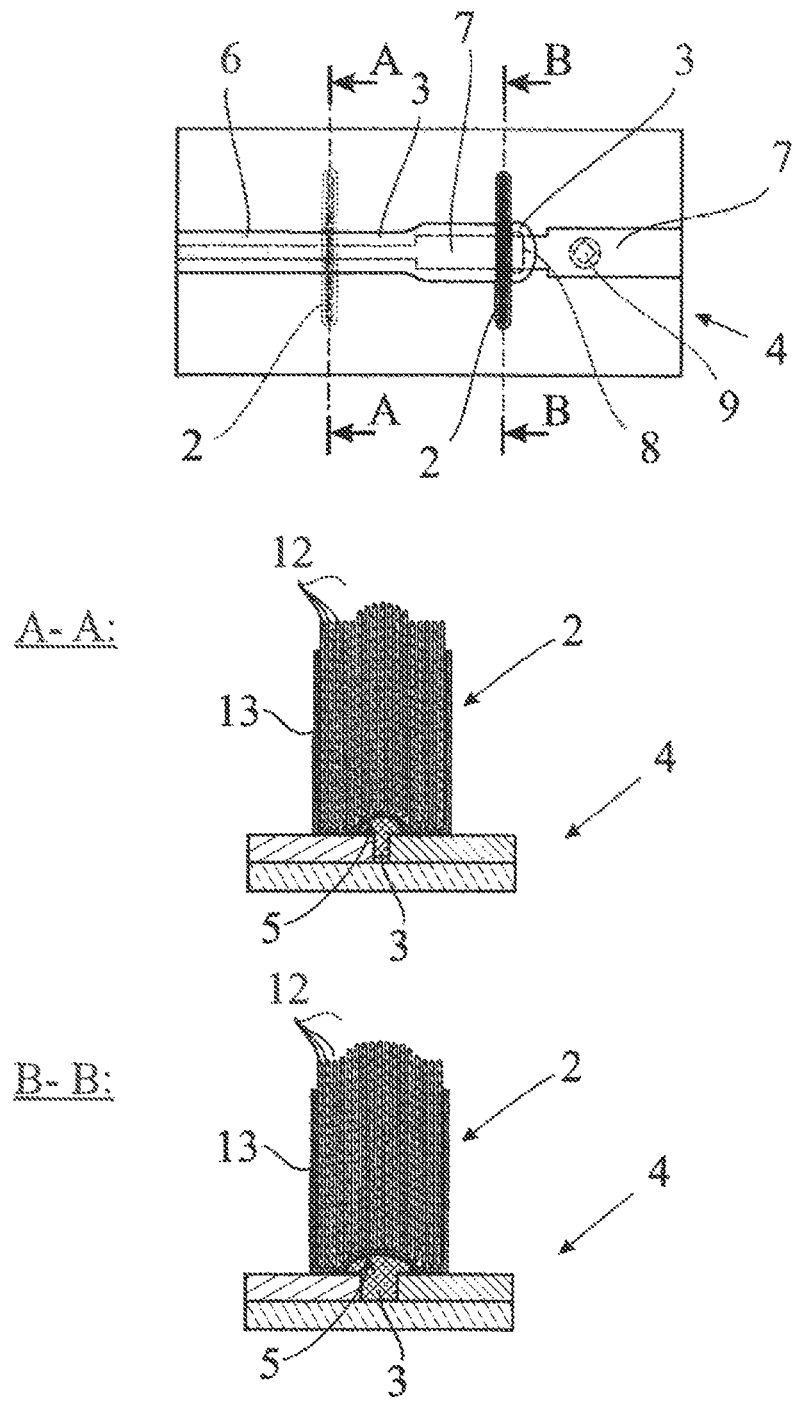
FIG. 5 shows various shaping contours for the filling of a joint.

This joint is shown in FIG. 5. As can be seen from the upper diagram, the joint 7 widens into two steps. By virtue of the adjustable shaping contour 5 of the shaper 2, the shaping contour 5 can be adapted to the greater width of the joint 7, as is visible in the comparison of the two sections A and B. The adaptation can, in particular, also be made continuously in order to provide a consistently good seam quality. Here, a sensor 9 detects the joint 7, in particular a gap and/or an edge, to which the viscous material 3 to be spread is intended to be applied and adapts the shaping contour 5 to the joint 7, in particular the gap and/or the edge.

Figure 6:
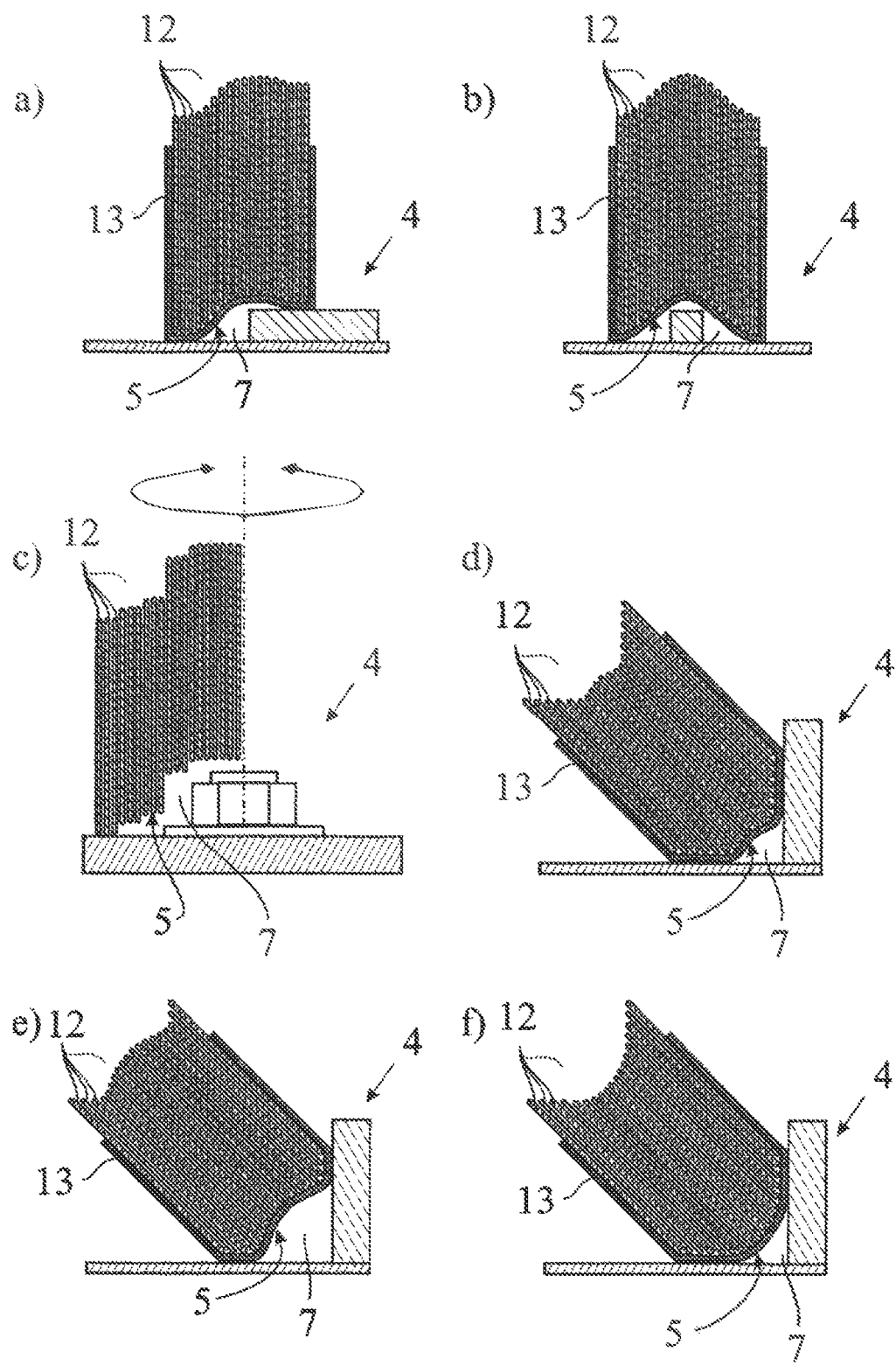
FIG. 6 shows various possible further shaping contours for producing different shapes of the viscous material.

In FIG. 6, various shaping contours 5 for various applications are shown.

In FIG. 6a, a lap joint, for instance, is coated with the viscous material 3 by a concave shaping contour 5.

In FIG. 6b, a concave shaping contour 5 is used to coat a local reinforcement. Here too, the shaping contour is of continuous configuration.

FIG. 6c, in turn, shows the application involving a sealing of a screw joint and/or rivet joint. Here, the shaping contour 5 is of discontinuous configuration. In this illustrative embodiment, the shaper 2 has no casing. Depending on the flexibility of the casing 13, discontinuous shape transitions are possible with a casing 13. In order to enable sealing of a screw joint, the spreading unit 1 is here rotationally movable, in particular about a rotation axis parallel to the rods 12. Alternatively, screw joints and/or rivet joints can also be sealed by a linear movement. In various embodiments, the sealing is here effected by an, in particular central, coating of the spreading unit 1 over the screw joint or the rivet, such as with an, in particular continuous, adaptation of the shaping contour to the rivet joint or screw joint.

In FIGS. 6d and 6e, in the region of the viscous material application, two substantially concave shaping contours for spreading the viscous material 3 in the region of a corner joint are shown. They produce a convex seam. They differ substantially in that the attachments in the side regions of the shaper are different in size and correspondingly differently thick seams are produced.

In FIG. 6f, in the region of the viscous material coating, a substantially convex shaping contour for spreading the viscous material 3 in the region of a corner joint is shown. In FIG. 6f, a concave seam is produced.

All features described in connection with the spreading unit can also be applied procedurally in the method according to the proposal. Also the features described according to the method can be provided in respect of the spreading unit. The same applies to the system according to the proposal. To this extent, reference is made reciprocally to the comments concerning the spreading unit, the comments concerning the system, and the comments concerning the method.

The invention claimed is:

1. A system for spreading a viscous material on a component, wherein the system comprises a spreading unit and a component receptacle for receiving a component, wherein the component comprising a joint,
    wherein the spreading unit comprises a shaper for spreading the viscous material on the component,
    the shaper comprising a shaping contour for a forming of the viscous material in a process of spreading, wherein the shaping contour of the shaper for the forming of the viscous material is adjustable by one or more actuators, wherein the shaper comprises a plurality of rods extending in parallel from the spreading unit, wherein the plurality of rods can be actuated in parallel by the one or more actuators causing an adjustment of the shaping contour of the shaper relative to the component,
    wherein the shaper has a casing, which provides the shaping contour and which consists of an elastomer material and/or comprises the elastomer material, wherein
    the shaper is configured to spread the viscous material along the joint.

2. The system according to claim 1, wherein the spreading unit has a nozzle for an application of the viscous material on the component.

3. The system according to claim 1, wherein the spreading unit has a sensor for detecting a region of the component that is to be coated.

4. The system according to claim 1, wherein the system has a manipulator with the spreading unit as an end effector.

5. The system according to claim 2, wherein the rods are adjustable by the one or more actuators in one motional direction and in the direction opposite to the motional direction, and/or, wherein plurality of the rods are adjustable by the one or more actuators in one motional direction and are pretensioned in the direction opposite to the motional direction.

6. The system according to claim 2, wherein the spreading unit has a contour shaft having a servo drive for the adjustment of the plurality of rods.

7. The system according to claim 2, wherein, for the adjustment of the shaping contour, a plurality of rods are individually driven.

8. The system according to claim 2, wherein the plurality of rods are adjustable via piezo actuators.

9. The system according to claim 3, wherein the sensor detects the region to be coated of the component, and sensor data is analyzed by a control system, the shaping contour of the shaper is controlled and/or regulated in dependence on the sensor data.

10. The system according to claim 9, wherein the control system controls and/or regulates, in dependence on the sensor data, a relative movement between the component and the spreading unit.

11. The system according to claim 9, wherein the control system regulates and/or controls, in dependence on the sensor data, a volume flow and/or a mass flow of the viscous material through the nozzle onto the region to be coated.

12. The system according to claim 1, wherein a region of the component which is to be coated includes the joint, and wherein the shaping contour is adapted to the joint.

13. The system according to claim 1, wherein, with the spreading of the viscous material, a seam is produced.

14. The system according to claim 13, wherein, in a course of the spreading, cross-sectional changes of the seam are continuously performed by alteration of the shaping contour.

15. The system according to claim 3, wherein the sensor comprises a line laser.

\* \* \* \* \*